United States Patent [19]

Dean

[11] Patent Number: 5,340,078
[45] Date of Patent: Aug. 23, 1994

[54] ACTUATOR FOR VALVE

[75] Inventor: Robert H. Dean, Evanston, Ill.

[73] Assignee: Midland Manufacturing Corp., Skokie, Ill.

[21] Appl. No.: 165,320

[22] Filed: Dec. 13, 1993

[51] Int. Cl.⁵ .............................................. F16K 31/14
[52] U.S. Cl. ..................................... 251/59; 137/377; 137/382; 251/292; 251/293
[58] Field of Search ....................... 137/377, 381, 382; 251/59, 14, 293, 292

[56] References Cited

U.S. PATENT DOCUMENTS

| | | |
|---|---|---|
| 702,342 | 6/1902 | Clough . |
| 1,186,885 | 6/1916 | Cook . |
| 2,206,707 | 7/1940 | Shaw ..................... 137/382 |
| 3,840,041 | 10/1974 | McMurray . |
| 4,131,133 | 12/1978 | Huwe . |
| 4,290,717 | 9/1981 | Aslen . |
| 4,313,595 | 2/1982 | Markley et al. . |
| 4,585,025 | 4/1986 | Hendrick . |
| 4,629,157 | 12/1986 | Tsuchiya et al. ........... 251/292 X |
| 4,633,897 | 1/1987 | Effenberger ............... 251/292 X |
| 4,834,137 | 5/1989 | Kawaguchi et al. . |
| 4,872,482 | 10/1989 | Jarrett ..................... 251/292 X |
| 4,887,634 | 12/1989 | Killian .................... 251/292 X |
| 4,917,143 | 4/1990 | Grooms . |
| 4,953,586 | 9/1990 | Weyer ..................... 251/292 X |
| 4,986,301 | 1/1991 | Ziliani et al. . |
| 5,052,430 | 10/1991 | Trautwein ................. 251/14 X |
| 5,257,771 | 11/1993 | Portis et al. .............. 251/59 X |

Primary Examiner—Martin P. Schwadron
Assistant Examiner—Kevin L. Lee
Attorney, Agent, or Firm—Emrich & Dithmar

[57] ABSTRACT

Coupling apparatus includes a bracket fixed to the housing of an air motor and an actuator mechanism fixed to the rotary output shaft of the air motor for coupling the air motor in driving engagement with a handwheel-operated valve for remote power actuation thereof. The apparatus is freely movable into and out of coupling engagement with the valve in directions axially of the valve stem without the use of tools, a retaining bar being pivotal between a release position accommodating movement of the apparatus into coupling engagement with the valve and a retaining position preventing movement from coupling engagement. A guard telescopes around the motor housing and is manually movable axially thereof between a use position enshrouding the handwheel and the actuator and a retracted position exposing the handwheel and the actuator, 20 Claims, 2 Drawing Sheets

ACTUATOR FOR VALVE

BACKGROUND OF THE INVENTION

1. Field of the Invention

The present invention relates to powered valve actuators for remotely-controlled operation of valves and, more particularly, to actuators for handwheel-operated valves. This invention is an improvement of a powered actuator disclosed in co-pending U.S. Pat. application Ser. No. 08/012,935, filed Feb. 17, 1993 and entitled "Powered Actuator for Valve".

2. Description of the Prior Art

Powered valve actuators typically include a motor, which has a housing and a rotating output shaft, and which is coupled to the handwheel or rotating operating element of the valve to effect rotation thereof. In such powered actuators, it is also necessary to provide a coupling between the motor and the valve so that the torque generated by the motor output shaft can operate the valve without causing displacement between the motor housing and the valve body. It is also necessary to prevent accidental separation occurring between the valve and the actuator.

In this regard, the aforementioned U.S. Pat. application Ser. No. 08/012,935 discloses a powered actuator with a bracket fixed to the motor housing and extending to a distal end which defines a generally C-shaped portion which can be fitted down over the valve body in a direction parallel to the motor axis into a coupling relationship with the valve substantially nonrotatable relative thereto about the axis of the valve stem. An actuator mechanism fixed to the motor output shaft has legs engageable in recesses in the valve handwheel for rotation thereof by the motor and hooks which fit around the edge of the handwheel to prevent movement of the actuator out of driving engagement with the handwheel.

A disadvantage of this prior arrangement is that, in order to secure the actuator to the handwheel and in order to remove it from the handwheel, it is necessary for an operator to manually set or release the hooks relative to the handwheel. This interjection of the operator's hands in close proximity to the rotating parts of the mechanism can be quite dangerous and could result in injury if the mechanism suddenly automatically starts to operate, as can occur in automatic emergency shutdown situations. Also, in this prior arrangement, the actuator mechanism and the handwheel are fully exposed in use, so that they are susceptible to inadvertent introduction of an operator's hands into close proximity with the rotating mechanism.

SUMMARY OF THE INVENTION

It is a general object of the invention to provide an improved coupling apparatus for coupling a powered actuator to a valve, which avoids the disadvantage of prior coupling arrangements, while affording additional structural and operating advantages.

An important feature of the invention is the provision of a coupling apparatus of the type set forth, which does not require that an operator's hands be placed in close proximity to the rotating parts of the mechanism.

Another feature of the invention is the provision of coupling apparatus of the type set forth, which includes a guard to prevent manual access to the rotating parts of the mechanism, in use.

Another feature of the invention is the provision of coupling apparatus of the type set forth, which is uniquely adapted for coupling to handwheel-operated valves.

A still further feature of the invention is the provision of a powered actuator incorporating a coupling apparatus of the type set forth.

These and other features of the invention are attained by providing coupling apparatus for coupling a drive motor to a valve, wherein the motor has a housing and a rotary output shaft and the valve has a body with a rotary valve stem and a handwheel for operating the valve stem, the apparatus comprising: an anchor bracket having a motor portion adapted to be fixedly secured to the motor housing and a valve portion shaped and dimensioned to be freely fitted around a portion of the valve body in coupling relationship therewith substantially non-rotatable relative thereto about the axis of the valve stem, actuator mechanism adapted to be fixedly secured to the motor output shaft and freely movable into driving engagement with the handwheel simultaneously with movement of the anchor bracket into coupling relationship with the valve body for effecting rotation of the handwheel in response to rotation of the motor output shaft, and retaining mechanism carried by the anchor bracket and movable between a release position accommodating free movement of the actuator mechanism to and from driving engagement with the handwheel and a retaining position engageable with the valve for cooperation with the actuator mechanism to prevent movement thereof from driving engagement with the handwheel.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
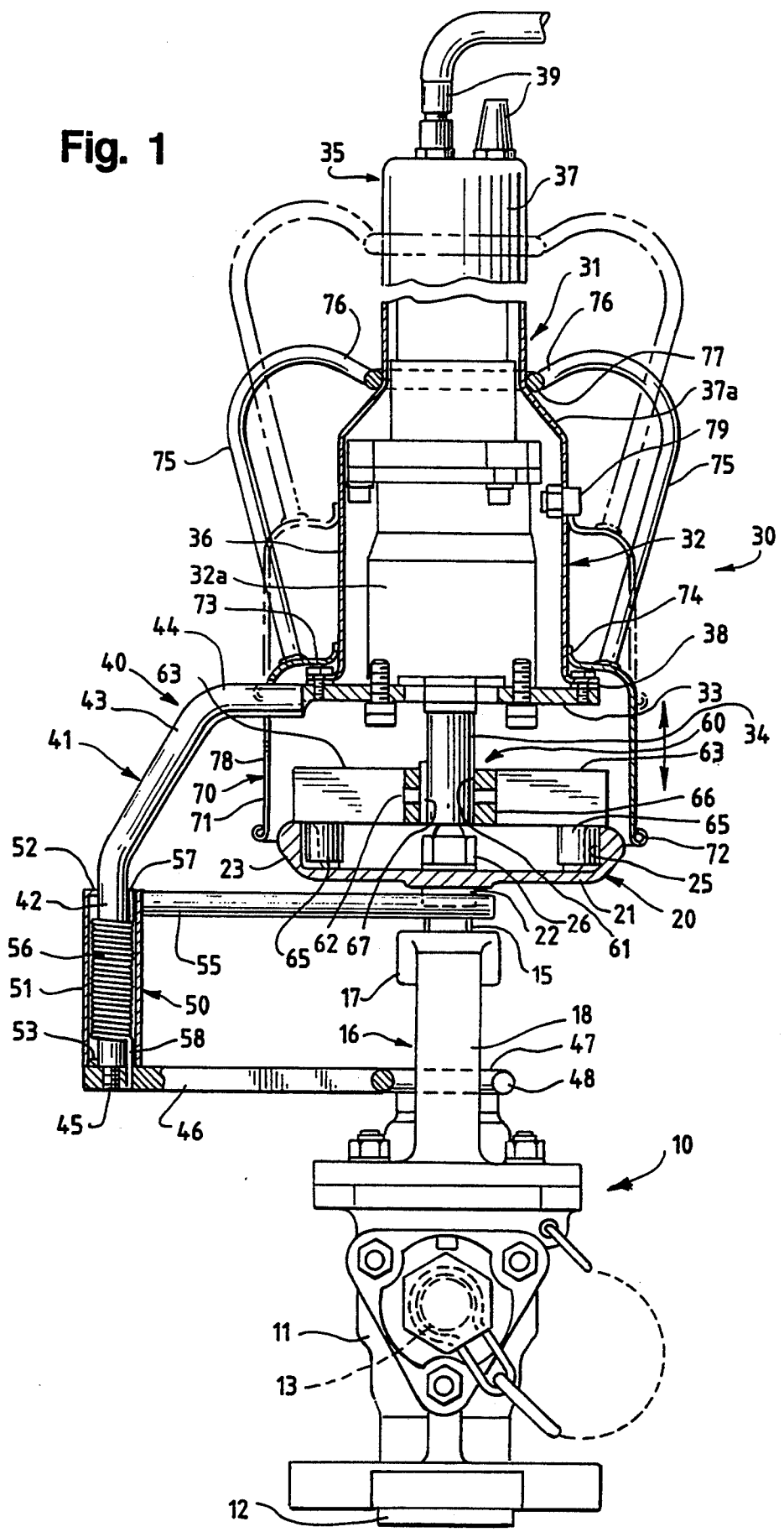
FIG. 1 is a side elevational view in partial section of a powered actuator in accordance with the present invention, shown coupled to an associated valve, and illustrating two different positions of the actuator guard.
Figure 2:
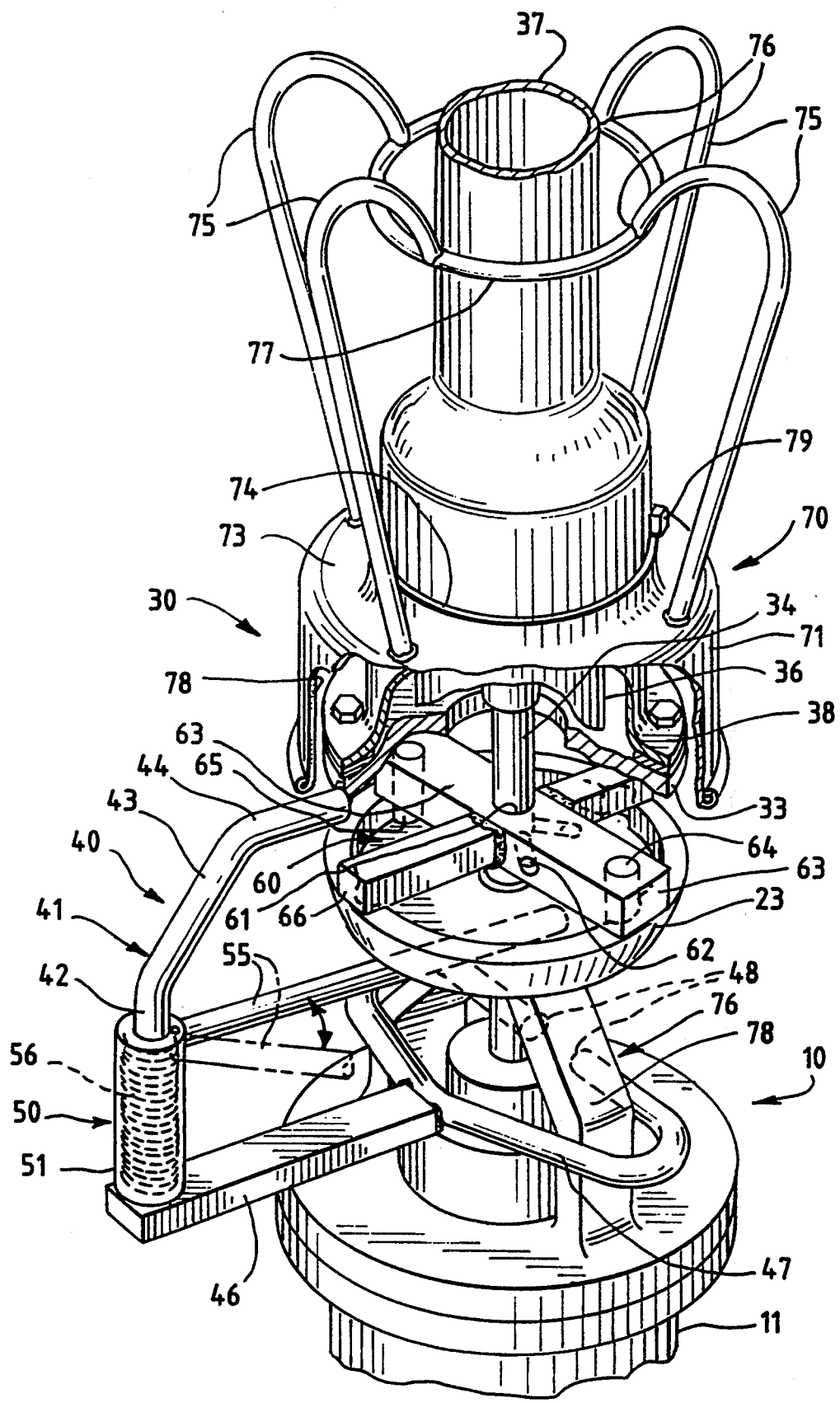
FIG. 2 is a fragmentary perspective view of the actuator and valve of FIG. 1, with portions broken away, and with the guard shown in its retracted position and illustrating two different positions of the retaining mechanism.

Referring to FIGS. 1 and 2, there is illustrated an angle valve 10, of the type used with chlorine cargo tanks. The valve 10 has a body 11 with a port 12 adapted to be coupled to an associated cargo vessel (not shown) in a known manner, and a port 13 adapted for coupling to another conduit (not shown). The valve 10 has an externally threaded stem 15 which projects from the upper end of the body 11 substantially coaxially with the port 12. The valve body 11 provides a yoke 16 which includes a cylindrical nut 17 threadedly engaged with the valve stem 15, and two diametrically opposed arcuate arms 18 which extend between the lower portion of the body 11 and the nut 17 for supporting the nut 17. The valve 10 includes a solid handwheel 20 which includes a substantially circular disk 21 having a hub 22 centrally thereof fixed to the upper end of the stem 15 by a handwheel nut 26. The disk 21 has an upstanding raised rim 23 integral therewith around the perimeter thereof. Formed on the inner surface of the raised rim 23 at equiangularly spaced-apart locations are a plurality of recesses 25, four such recesses being illustrated in FIG. 2. It will be appreciated that the handwheel 20 is used to rotate the stem 15, which travels axially relative to the body 11 by reason of its threaded engagement with the nut 17, for actuation of the valve 10 between its open and closed conditions, all in a known manner.

In order to effect remotely-controlled, powered rotation of the handwheel 20, there is provided a powered actuator assembly 30, which includes a rotary air motor 31, having a generally cylindrical housing 32 including a body 32a closed at the lower end thereof by an end plate 33 bolted thereto, from which there coaxially extends a rotatable output shaft 34. The motor housing 32 may include a cylindrical protective cover 35 around the body 32a coaxially therewith, the cover 35 including a large diameter lower portion 36 and a reduced diameter upper portion 37 joined by a frustoconical shoulder portion 37a. The lower portion 36 is provided at its distal end with a radially outwardly extending annular gasketed flange 38 overlying and fixed to the end plate 33, which preferably extends radially outwardly beyond the body 32a, thereby to effect a closure with the housing 32. The air motor 31 is provided with air conduits 39 adapted for coupling to associated supplies and exhaust of pressurized air for operation of the air motor 31. It will be appreciated that, in operation, the air motor 31 operates to rotate its output shaft 34 about its axis in either of two rotational directions relative to the housing 32, all in a known manner.

The actuator assembly 30 includes a coupling adaptor 40 for coupling the air motor 31 to the valve 10. More specifically, the coupling adaptor 40 includes an anchor bracket 41 for coupling the motor housing 32 to the valve arms 18 and an actuator frame or coupler 60 for coupling the motor output shaft 34 to the handwheel 20. The anchor bracket 41 is in the form of a cylindrical rod bent to define an upstanding vertical lower portion 42, an intermediate inclined portion 43 and a horizontally extending upper portion 44. The upper portion 44 is fixed, as by welding, to the peripheral edge of the end plate 33 of the air motor housing 32. The vertical lower portion 42 has a reduced-diameter distal end which threadedly engaged in an associated bore at one end of an elongated, generally rectangular base plate 46 which disposed horizontally in use substantially parallel to the upper portion 44.

Fixedly secured, as by welding, to the base plate 46 at its distal end is a generally C-shaped collar 47, which is generally in the form of a metal rod, circular in transverse cross section, and bent in the shape of an elongated "C" disposed on its side. The collar 47 defines substantially more than half of a closed loop, with its distal ends 48 spaced-apart a distance substantially less than the maximum width of the valve yoke 16. The base plate 46 and the collar 47 are so dimensioned and arranged that the collar 47 is substantially coplanar with the base plate 46 and is disposed substantially coaxially with the motor shaft 34. Thus, when the anchor bracket 41 is arranged with the C-shaped collar 47 disposed between the handwheel 20 and the yoke 16, with the upper portion 44 disposed above the handwheel 20, and with the motor output shaft 34 substantially coaxial with the valve stem 15, the collar 47 will be disposed in vertical alignment with the yoke arms 18, so that when the actuator assembly 30 is lowered axially of the valve stem 15, the collar 47 will drop into encompassing relationship with the yoke arms 18 so as to be substantially non-rotatable relative thereto about the axis of the valve body 10.

The coupling adaptor 40 also includes a retaining mechanism 50, which includes a hollow tube 51 circular in transverse cross section, disposed in coaxial surrounding relationship with the vertical portion 42 of the anchor bracket 41, the tube 51 being closed at its upper and lower ends by end plates 52 and 53, respectively provided with coaxial openings to freely rotatably accommodate the lower end portion 42 of the anchor bracket 41 therethrough. Fixedly secured to the tube 51 at the upper end thereof, as by welding, is an elongated retaining arm 55 in the form of a bar, circular in transverse cross section, the arm 55 projecting from the tube 51 substantially perpendicular thereto so as to be substantially parallel to the base plate 46. The arm 55 has a length sufficient to extend a slight distance beyond the valve stem 15 when the actuator assembly 30 is mounted in place on the valve 10. Disposed within the tube 51 and coaxially encircling the lower portion 42 of the anchor bracket 41 is a torsion spring 56, having upper and lower free ends 57 and 58 which project parallel to the axis of the spring 56. The free ends 57 and 58 are, respectively, received in complementary openings in the end plates 52 and 53, the opening in the lower end plate 53 being an elongated arcuate slot. The lower free end 58 is also received in a complementary bore in the base plate 46 and is preferably secured thereto, as by welding. Accordingly, it will be appreciated that the tube 51 and the retaining arm 55 are freely rotatable about the axis of the lower portion 42 of the anchor bracket 41 between a retaining position shown in solid line in the drawings, with the retaining arm 55 disposed nearly parallel to the axis of the base plate 46, and a release position, illustrated in broken line in FIG. 2, disposed at a substantial acute angle with respect to the axis of the base plate 46 sufficient to clear the perimeter of the handwheel 20. The retaining arm 55 is resiliently urged to its retaining position by the torsion spring 56, and movement of the arm 55 is limited by engagement of the lower free ends 58 of the spring 56 against the ends of the associated slot in the lower end plate 53.

The actuator frame or coupler 60 is generally cruciform in shape and includes a central bore 61 adapted to receive therethrough the lower end of the motor output shaft 34 for attachment thereto, as by a key 67 and set screws 62. The actuator frame 60 has two opposed arms 63, respectively provided with circular holes 64 therethrough for respectively receiving the upper ends of depending tubular legs 65, which are fixed to the actuator frame 60 by suitable means. The actuator frame 60 also has opposed arms 66 aligned substantially perpendicular to the arms 63. The parts are so dimensioned and arranged that the legs 65 are respectively receivable in engagement with two opposed ones of the handwheel recesses 25 for rotation of the handwheel 20 in response to rotation of the motor output shaft 34. The arms 66 are arranged to span and rest on the rim 23 of the handwheel 20 to effect a squaring function, i.e., to hold the axis of the shaft 34 parallel to the valve stem 15.

The coupling adaptor 40 also includes a guard or shroud 70 which has a circularly cylindrical side wall 71 having a diameter slightly greater than that of the hand wheel 20 and having a rolled lower edge 72. Integral with the side wall 71 at the upper end thereof is a radially inwardly extending annular top wall 73, which is, in turn, integral at its inner edge with an upstanding short cylindrical lip 74 coaxial with the side wall 71 and dimensioned to be received telescopically around the large diameter lower portion 36 of the motor cover 35 in close-fitting sliding relationship therewith. Fixedly secured to the top wall 73, as by welding, are a plurality of equiangularly spaced apart handles 75, preferably four in number. Each of the handles 75 is in the form of an inverted J, the distal hook ends 76 of the handles 75 being interconnected, as by welding, by a ring 77 coaxially encircling the reduced-diameter portion 37 of the motor cover 35 in close-fitting sliding relationship therewith. Formed on the lower edge of the side wall 71 and extending substantially the entire axial extent thereof is an elongated slot 78 dimensioned to accommodate the upper portion 44 of the anchor bracket 41.

In use, the guard 70 can be manually grasped by any one of the handles 75 and moved between a lowered use position, illustrated in solid line in FIG. 1, and a raised or retracted position, illustrated in broken line in FIG. 1 and in solid line in FIG. 2. The guard 70 is stopped in its raised position by engagement of the lip 74 with a stop nut 79 fixed to the large diameter portion 36 of the air motor housing 32. The elongated slot 78 is dimensioned so as to remain in engagement with the upper portion 44 of the anchor bracket 42 in both raised and lowered positions of the guard 70, so that the guard 70 cannot be rotational reoriented. Thus, when the guard 70 is released it will automatically return to its lowered position. The cylindrical side wall 71 of the guard 70 is so dimensioned that, when it is disposed in its use position, it completely covers and encompasses the actuator frame 60 and the upper portion of the handwheel 20, when the actuator frame 60 is disposed in driving engagement with the hand wheel 20. It can be seen that the guard 70 is stopped in its use position by engagement of the ring 77 with the shoulder 37a of the motor cover 35, and by engagement of the anchor bracket 41 with the upper end of the guard slot 78. Thus, the guard 70 serves to prevent an operator from inserting his hand into the rotating parts of the actuator assembly 30 and the associated handwheel 20 so as to protect him from accidental injury. However, the guard 70 can be manually raised to its retracted position to permit access to the actuator frame 60 and the handwheel 20 so that they can be viewed to determine whether they are properly engaged.

It is a significant aspect of the invention that the powered actuator assembly 30 can be moved into and out of driving engagement with the valve 10 without the use of tools. More specifically, in order to couple the powered actuator assembly 30 to the valve 10, the operator grasps one of the handles 75 of the guard 70 with one hand and grasps the tube 51 of the retaining mechanism 50 with the other hand, lifts the guard 70 to its raised position and then lifts and positions the actuator assembly 30 alongside the valve 10 with the C-shaped collar 47 disposed at a level between the handwheel 20 and the yoke 16. The anchor bracket 41 is so dimensioned that, in this position, the actuator frame 60 will be disposed above the level of the handwheel 20. The actuator assembly 30 is then moved horizontally toward the valve 10 to bring the motor output shaft 34 substantially into coaxial alignment with the valve stem 15. Then, with his other hand, the operator grasps the tube 51 and pivots the retaining arm 55 to its release position clearing the handwheel 20, whereupon the actuator assembly 30 is lowered axially of the stem 15 into coupling engagement with the valve 10.

More specifically, the actuator frame legs 65 are lowered into engagement in associated ones of the handwheel recesses 25, the parts being dimensioned so that when thus engaged, the C-shaped collar 47 will be disposed in encompassing relationship with the yoke arms 18. It may be necessary to rotate the motor output shaft 34 slightly to align the legs 65 with the handwheel recesses 25. The retaining arm 55 is then allowed to pivot back to its retaining position, the parts being so dimensioned that it will then be disposed between the handwheel 20 and the nut 17. The guard 70 can then be relowered to its use position. It is significant that all of this can be accomplished without any need for the operator to handle the actuator frame 60 or the handwheel 20, or to otherwise insert his hand into close proximity thereto.

The anchor bracket 41 is so dimensioned and arranged that, when the coupling adaptor 40 is thus engaged with the valve 10, the anchor bracket 41 clears the handwheel 20, and the actuator assembly 30 is supported on the handwheel 20. When the air motor 31 is actuated it will, therefore, rotate the handwheel 20 with the C-shaped collar 47 engaging the yoke arms 18 to prevent substantial rotation of the air motor housing 32 relative to the valve body 10. Since the actuator assembly 30 is supported on the handwheel 20, it will move vertically with the handwheel 20 as the valve 10 is moved between its open and closed conditions, but the axial travel of the valve stem 15 between the open and closed conditions is sufficiently small that the C-shaped collar 47 remains disposed for retaining engagement with the yoke arms 18.

In order to disengage the actuator assembly 30 from the valve 10, it is necessary only to pivot the retaining arm 55 to its release position to clear the handwheel 20 and then lift the entire actuator assembly 30 until the legs 65 are disengaged from the handwheel 20 and the collar 47 is disengaged from the yoke 16, and then move the actuator assembly 30 laterally away from the valve 10. These simple engaging and disengaging movements can be effected quickly and easily without the use of tools.

From the foregoing, it can be seen that there has been provided an improved powered actuator assembly which includes a coupling arrangement for permitting the actuator assembly to be moved into and out of coupling engagement with an associated valve without the use of tools, the assembly being provided with retaining mechanism and with a guard mechanism which permits it to be retained in place on the valve without the need for introduction of the operator's hands into close proximity with the rotating parts of the apparatus and while preventing accidental contact with such parts.

I claim:

1. Coupling apparatus for coupling a drive motor to a valve, wherein the motor has a housing and a rotary output shaft and the valve has a body with a rotary valve stem and a handwheel for operating the valve stem, said apparatus comprising: an anchor bracket having a motor portion adapted to be fixedly secured to the motor housing and a valve portion shaped and dimensioned to be freely fitted around a portion of the valve body in coupling relationship therewith substantially non-rotatable relative thereto about the axis of the valve stem, actuator mechanism adapted to be fixedly secured to the motor output shaft and freely movable into driving engagement with the handwheel simultaneously with movement of said anchor bracket into coupling relationship with the valve body for effecting rotation of the handwheel in response to rotation of the motor output shaft, and retaining mechanism carried by said anchor bracket and movable between a release position accommodating free movement of said actuator mechanism to and from driving engagement with the handwheel and a retaining position engageable with the valve for cooperation with said actuator mechanism to prevent movement thereof from driving engagement with the handwheel.

2. The apparatus of claim 1, wherein said bracket has a distal end portion defining a part of a loop disposed substantially coaxial with said motor output shaft so as to be movable in a direction axially of the valve stem into and out of coupling relationship with the valve body.

3. The apparatus of claim 2, wherein said retaining mechanism includes a pivot joint accommodating pivotal movement of said retaining mechanism between the release and retaining positions thereof.

4. The apparatus of claim 3, wherein said retaining mechanism includes an elongated retaining arm movable between the release and retaining positions in a plane substantially perpendicular to the motor output shaft, said arm in its release position clearing the handwheel to permit said actuator mechanism to be moved into and out of driving engagement with the handwheel in a direction axially of the valve stem, said arm in its retaining position being engageable with the underside of the handwheel to prevent movement of said actuator mechanism from driving engagement with the handwheel.

5. The apparatus of claim 4, wherein said retaining mechanism includes a tubular sleeve integral with said retaining arm at one end thereof and disposed in surrounding relationship with a portion of said anchor bracket for free pivotal movement relative thereto.

6. The apparatus of claim 1, wherein said retaining mechanism includes bias means resiliently biasing said mechanism to the retaining position thereof.

7. Actuator apparatus for a valve which includes a body and a rotary valve stem and a handwheel for operating the valve stem, said apparatus comprising: a drive motor including a housing and a rotary output shaft, an anchor bracket fixed to the motor housing and shaped and dimensioned to be freely fitted around a portion of the valve body in coupling relationship therewith substantially non-rotatable relative thereto about the axis of the valve stem, actuator mechanism adapted to be fixedly secured to said motor output shaft and freely movable into driving engagement with the handwheel simultaneously with movement of said anchor bracket into coupling relationship with the valve body for effecting rotation of the handwheel in response to rotation of the motor output shaft, and a guard carried by said motor housing and movable between a use position substantially encompassing and covering said actuator mechanism and the associated handwheel and a retracted position exposing said actuator mechanism and the associated handwheel.

8. The apparatus of claim 7, wherein said motor housing is substantially cylindrical in shape, said guard being substantially cylindrical and disposed in telescoping relationship around said housing.

9. The apparatus of claim 8, wherein said guard has an axial extent such that in its use position it substantially encompasses and covers the associated handwheel in any position thereof, said guard including stop means engageable with said motor housing for limiting movement of said guard toward its use position.

10. The apparatus of claim 7, wherein said guard includes means slidably engageable with said motor housing for guiding movement of said guard between its use and retracted positions.

11. The apparatus of claim 7, and further comprising handle means on said guard to facilitate manual movement thereof between the use and retracted positions thereof.

12. The apparatus of claim 11, wherein said handle means includes a guide portion disposed for sliding engagement with said motor housing to facilitate guiding the movement of said guard between its use and retracted positions.

13. The apparatus of claim 12, wherein said handle means includes a plurality of handles equiangularly spaced apart about said motor housing, said guide portion comprising a loop encircling said motor housing and interconnecting said handles.

14. Actuator apparatus for a valve which includes a body and a rotary valve stem and a handwheel for operating the valve stem, said apparatus comprising: a drive motor including a housing and a rotary output shaft, an anchor bracket fixed to the motor housing and shaped and dimensioned to be freely fitted around a portion of the valve body in coupling relationship therewith substantially non-rotatable relative thereto about the axis of the valve stem, actuator mechanism adapted to be fixedly secured to said motor output shaft and freely movable into driving engagement with the handwheel simultaneously with movement of said anchor bracket into coupling relationship with the valve body for effecting rotation of the handwheel in response to rotation of the motor output shaft, retaining mechanism carried by said anchor bracket and movable between a release position accommodating free movement of said actuator mechanism to and from driving engagement with the handwheel and a retaining position engageable with the valve for cooperation with said actuator mechanism to prevent movement thereof from driving engagement with the handwheel, and a guard carried by said motor housing and movable between a use position substantially encompassing and covering said actuator mechanism and the associated handwheel and a retracted position exposing said actuator mechanism and the associated handwheel.

15. The apparatus of claim 14, wherein said bracket includes a laterally extending portion shaped and dimensioned so that when said bracket is disposed in coupling relationship with the valve body said laterally extending portion clears the handwheel.

16. The apparatus of claim 15, wherein said guard has a slot formed therein accommodating said laterally extending portion of said bracket.

17. The apparatus of claim 14, wherein said retaining mechanism includes an elongated arm pivotally movable between release and retaining positions in a plane disposed substantially perpendicular to said axis of said motor output shaft.

18. The apparatus of claim 17, wherein said retaining mechanism further includes bias means resiliently urging said arm to the retaining position thereof.

19. The apparatus of claim 14, wherein said motor housing is substantially cylindrical in shape.

20. The apparatus of claim 19, and further comprising handle means on said guard to facilitate manual movement thereof between the use and retracted positions thereof.

* * * * *